United States Patent Office 2,860,113
Patented Nov. 11, 1958

2,860,113

RESIN DERIVED FROM POLYHYDRIC ALCOHOL, FATTY OIL, BENZENE TRIBASIC ACID AND DIAMINODURENE

Benjamin A. Bolton, Hammond, and Richard E. Van Strien, Griffith, Ind., assignors to Standard Oil Company, Chicago, Ill., a corporation of Indiana No Drawing. Application December 16, 1955
Serial No. 553,406

8 Claims. (Cl. 260—22)

This invention relates to oil-modified alkyd composition which is suitable for protective coatings, particularly baked coatings.

An object of the invention is an oil-modified alkyd resin suitable for protective coatings. Another object is an oil-modified alkyd resin suitable for baked coatings. Another object is an oil-modified alkyd resin made by a process utilizing benzene tricarboxylic acid. Other objects will become apparent in the course of the detailed description of the invention.

The oil-modified alkyd resin of the invention comprises (1) reacting a polyhydric alcohol and a member of the class consisting of vegetable oil, marine oil and fatty acids in relative amounts such that essentially only one hydroxyl group in said alcohol remains unreacted, (2) reacting in essentially equi-molar amounts the product of 1 and an acid selected from the class consisting of benzene tricarboxylic acid and anhydrides to form a product containing essentially two unreacted carboxyl groups and (3) under polyester condensation reaction conditions producing an alkyd resin by reacting the product of 2 with a tetramethyl diamino benzene, wherein said diamine is charged in an amount from about 5 to about 20 mole percent in excess of the stoichiometric requirement.

The first stage of the process of the invention involves the alcoholysis reaction of a polyhydric alcohol and a vegetable oil, marine oil, fatty acid or mixture thereof. The polyhydric alcohol may be any one of the alcohols which contain at least two hydroxyl groups. Examples of typical polyhydric alcohols which have been used in the preparation of alkyd resins and may be used herein are glycerol, trimethylol ethane, pentaerythritol, dipentaerythritol, sorbitol and mannitol. In addition to these polyhydric alcohols, diols may be used, such as ethylene glycol, propylene glycol, diethylene glycol, dipropylene glycol, tetraethylene glycol, etc. Glycerol is preferred as the polyhydric alcohol for use in the first stage of the process.

The polyhydric alcohol is reacted with one of the oils or fatty acids conventionally used in oil-modified alkyd resin production. The fatty acids utilized may be a mixture of fatty acids derived from one of the oils or may be a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behanic, oleic, linoleic, linolenic, ricinoleic, erucic.

The first stage reaction is carried out utilizing a relative amount of alcohol and oil such that all but one of the hydroxyl groups of the alcohol are reacted; or, conversely, relative amounts such that essentially only one hydroxyl group in the alcohol remains unreacted. For example, one mole of glycerol is reacted with two moles of linseed oil to produce three moles of a diglyceride.

The reaction between the alcohol and the oil in the first stage is carried out under typical alcoholysis conditions. For example, the reaction is carried on at a temperature between about 300° F. and 500° F. under an inert atmosphere for a time such that the desired methanol compatibility is reached.

After the alcoholysis reaction of the first stage has been completed, a benzene tricarboxylic acid or anhydride is added to the product of the alcoholysis reaction. The benzene tricarboxylic acids are trimesic, trimellitic, and hemimellitic. It is preferred to use either the trimellitic acid or the trimellitic anhydride. The acid or anhydride and the alcoholysis reaction product are charged in about equi-molar amounts, in order to produce a reaction product which contains two unreacted carboxyl groups on the acid molecule.

The second stage reaction is carried out under conditions of time and temperature such as are used in conventional alkyd resin production, although higher temperatures may be used. For example, the second stage reaction may be carried out at a temperature of between about 400° F. and about 500° F. The heating of the two reactants is carried on until a single phase homogeneous solution has been obtained. Preferably the reaction is carried on for a period of a few minutes longer than that needed to obtain a homogeneous solution.

The oil-modified alkyd resin product is obtained by reacting, under polyester condensation conditions, the product of the second stage of the process with a tetramethyl diamino benzene, such as diamino durene or diamino isodurene.

The tetramethyl diamino benzene is utilized in the third stage in an amount from about 5 to about 20 mole percent in excess of the theoretical stoichiometric requirement for the reaction. More usually, the excess is about 15 mole percent.

The third stage of reaction is carried out under typical polyester condensation reactions. For example, the reaction is carried out at a temperature between about 400° F. and 500° F. The reaction is carried on until the reaction product has the desired viscosity and also the desired acid number.

The oil-modified alkyd resin product of the third stage of the process may then be blended with hydrocarbon solvents such as mineral spirits and also blended with pigments to produce the particular type of coating material desired for a particular use.

The process of the instant application and the products made therefrom are illustrated by the following example.

*Example*

In the first stage of the process, 35.0 grams of soybean oil and 1.8 grams of glycerol were added to a flask equipped with a motor-driven stirrer, a thermometer and a reflux condenser. Provisions were made for the maintenance of a nitrogen atmosphere in the flask. The oil and glycerol were heated to 300° F. when 0.1 gram of calcium hydroxide were added as alcoholysis catalyst. The temperature in the flask was gradually increased to about 450° F. over a period of 38 minutes when the reaction was complete.

The second stage of the process was carried out by adding 12.6 grams of trimellitic acid to the flask. The contents of the flask were agitated at a temperature of about 450° F. for one hour and 10 minutes. This time was a few minutes in excess of that time required for the disappearance of the separate phases of alcoholysis reaction product and trimellitic acid and the appearance of a single homogeneous solution in the flask.

In the third stage, 10.7 grams of diamino durene were added and the temperature was held at about 450° F. for 2 hours and 30 minutes.

The reaction product was diluted with mineral spirits to give a solution containing 64% solids, i. e., 64 weight percent of the alkyl resin product of the third stage. The acid number (mg. KOH/100 g.) of the solution was 18. A film one mil thick was formed on glass plate and baked at 110° C. for 1 hour. The Sward hardness of the baked film was 30—a hardness suitable for use in appliance coatings requiring considerable durability. (Physical and Chemical Examination of Paints, Varnishes, Lacquers and Colors, by Gardner and Sward, 10th edition, 1946.)

Thus having described the invention, what is claimed is:

1. An oil-modified resin consisting of the product made by (I) reacting in an inert atmosphere and in the presence of an alcoholysis catalyst, a polyhydric alcohol and a member of the class consisting of vegetable oil, fish oil and fatty acids containing at least 10 carbon atoms in relative amounts such that essentially only one hydroxyl group in said alcohol remains unreacted, at a temperature between about 300° F. and 500° F. for a time such that the desired methanol compatibility is reached, (II) reacting in essentially equi-molar amounts the product of (I) and an acidic material selected from the class consisting of trimesic acid, hemimellitic acid, trimellitic acid and trimellitic anhydride to form a product containing essentially two unreacted carboxyl groups on said acid molecule, at a temperature between about 400° F. and 500° F. until a single phase homogeneous solution is obtained and (III) reacting the product of (II) with tetramethyldiaminobenzene, said amine being charged in an amount from about 5 to about 20 mole percent in excess of the stoichiometric requirement, at a temperature between about 400° F. and 500° F. for the time necessary to obtain the desired viscosity and desired acid number product.

2. An oil-modified resin consisting of the product made by (I) reacting in an inert atmosphere and in the presence of an alcoholysis catalyst about 1.8 parts by weight of glycerol and about 35 parts by weight of soybean oil at a temperature of about 450° F. until the alcoholysis reaction is complete said reaction product being characterized by the presence of essentially only one unreacted hydroxyl group in said glycerol, (II) reacting the product of (I) with about 12.6 parts by weight of trimesic acid at a temperature of about 450° F. until a single homogeneous solution is obtained in the reaction zone said reaction product being characterized by essentially two unreacted carboxyl groups on said acid molecule, and (III) reacting the product of (II) with about 10.7 parts by weight of diaminodurene at a temperature of about 450° F. until the acid number of the reaction product is about 18.

3. The resin of claim 1 wherein the alcohol of I is glycerol.

4. The resin of claim 1 wherein the oil of I is soybean oil.

5. The resin of claim 1 wherein the acid of II is trimellitic acid.

6. The resin of claim 1 wherein the amine of III is diamino durene.

7. A composition comprising (a) a hydrocarbon solvent and (b) the resin of claim 1.

8. A composition comprising (i) a hydrocarbon solvent, (ii) a pigment and (iii) the resin of claim 1.

References Cited in the file of this patent
UNITED STATES PATENTS 2,048,778    Brubaker et al. _____ July 28, 1936